July 3, 1951  C. F. WALZ  2,559,098
FROST SHIELD AND METHOD OF MAKING SAME
Filed Nov. 20, 1948  2 Sheets—Sheet 1

INVENTOR.
CARL F. WALZ
BY Paul, Paul & Moore
ATTORNEYS

July 3, 1951 C. F. WALZ 2,559,098
FROST SHIELD AND METHOD OF MAKING SAME
Filed Nov. 20, 1948 2 Sheets—Sheet 2

INVENTOR.
CARL F. WALZ
BY Paul, Paul & Moore
ATTORNEYS

Patented July 3, 1951

2,559,098

UNITED STATES PATENT OFFICE 2,559,098

FROST SHIELD AND METHOD OF MAKING SAME

Carl F. Walz, Minneapolis, Minn., assignor to Durkee-Atwood Company, Minneapolis, Minn., a corporation of Minnesota Application November 20, 1948, Serial No. 61,185

9 Claims. (Cl. 154—116)

This invention relates to pressure sensitive adhesive articles having a curved composite strip of originally straight adhesive spacing and/or fastening material on a portion thereof, wherein the adhesive surface is covered with a removable plastic film capable of being stripped off to expose the adhesive just prior to fastening the article. Articles of this type, of which automotive and aircraft frost shields and advertising novelties are examples, usually have a flat area of glass or plastic having a peripheral margin that is curved at at least some of the portions. Thus, in usual frost shields the pattern of the glass or plastic shield may be generally rectangular with curved corners or with angular corners with curved portions at other places around the margin, the spacing and fastening marginal composite strip being around the margin thereof. The same is true of many advertising novelties and similar devices to which this invention is applicable.

Prior to the present invention it was customary to make the composite spacing and/or fastening adhesive strip in continuous straight lengths having an adhesive rubber compound on each face coated on during manufacture and covered by a removable cloth or plastic sheet. Where the strips were used for frost shields they were usually thicker than for advertising novelties, so as to provide a dead air space, and frequently the composite strip contained one or more layers of cloth which served to reinforce the strip and prevent stretching during application.

When the strips were applied to the article (such as a frost shield etc.) one of the protecting facings would be removed and the strip would then be fastened along the margins of the article and held by the thus exposed underlying adhesive layer, the upper or outward adhesive layer of the strip being still covered by the protective plastic sheet. In bending the strip around curves a buckling occurs on the upper or outer protective layer where this layer is of plastic and it therefore had to be removed and the exposed adhesive would then be covered by a plurality of straight and specially die-cut curved pieces so as to protect the adhesive until the manufactured article was ready to be installed.

The necessity of removing the original (straight) protective covering from the strip and replacing it with straight and specially cut curved segments increased the cost and resulted in a product not always satisfactory for use.

It is an object of this invention to provide improved articles of the foregoing type and to provide methods and machines for producing same, wherein there is no necessity for removing the original protective sheet on the upper or exposed surface of the adhesive and/or spacing strip and yet to provide articles wherein the protective sheet is flat, free from wrinkles or buckling and wherein the underlying adhesive is completely covered and protected by a smooth easily removable tape or sheet which smoothly overlies the adhesive even at the corners.

It is a further object of the invention to provide an improved article of manufacture having a planar area with at least some portion of its marginal edge curved and provided at said curved marginal edges with an adhesive strip wherein the strip has an upper or outer adhesive surface which is covered with a smooth plastic protective coating ironed flat and free from buckling or surface irregularities, and to provide methods and apparatus for making such an article.

It is also an object of the invention to provide improved methods and apparatus for making frost shields of the type having curved marginal edges having an originally straight composite adhesive coated spacer and fastening strip curved around its marginal edge and wherein the adhesive is covered by an easily removable continuous hot workable plastic facing flat and free from buckling at the curves.

It is a further object of the invention to provide an improved method and apparatus for making and attaching a strip material to curves, said strip being adhesively coated on opposite faces and fastenable by the adhesive to an object along a curved line, the opposite adhesive face being protected, until ready for application to another surface, by a smooth plastic surfacing layer ironed flat at least around said curves, and to provide the resultant product.

Other and further objects of the invention are those inherent in the apparatus herein illustrated, described and claimed.

The invention is illustrated with reference to the drawings in which corresponding numerals refer to the same parts and in which Figure 1 is an isometric view partly broken away showing the strip material of the instant invention during process of manufacture;

Figure 1:
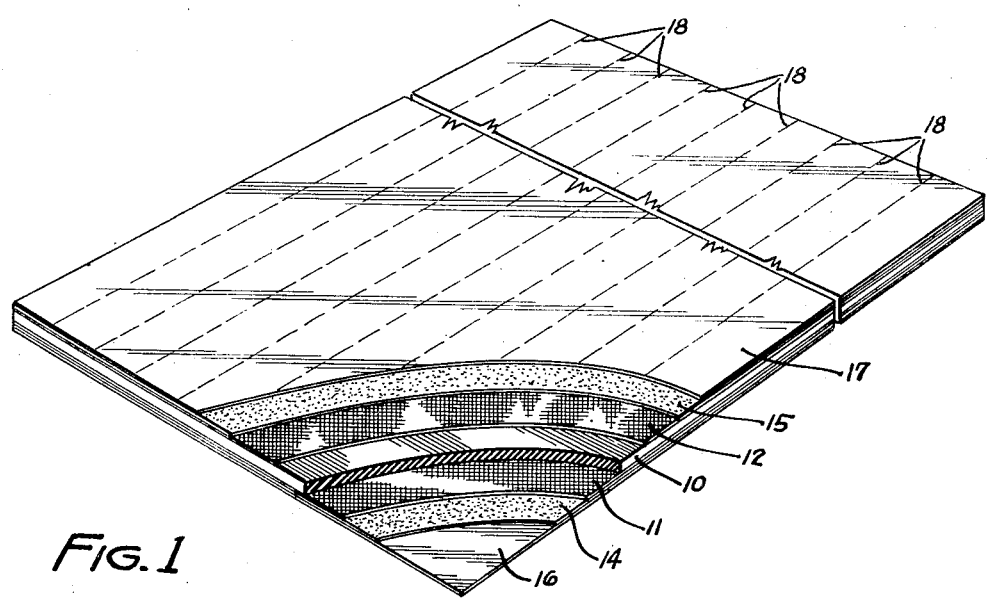

Referring to the drawings there is illustrated a composite sheet of material during the process of manufacture and from which the adhesively coated strips of the present invention are severed. In the material shown in Figure 1 the central portion 10 may be composed of rubber compound or other flexible material and may be as thick as desired for the particular purpose for which the adhesively coated composite strips are used. When used for frost shield manufacture the portion 10 of rubber composition is normally ⅛ to ⅟₁₆ of an inch thick, but may be thicker or thinner depending upon the design of frost shield. For advertising novelties and the like where a spacing of the planar article from the surface to which it is applied is not of importance, the thickness of the portion 10 may be reduced. In Figure 1 there are also shown reinforcing cloths 11 and 12 which are preferably laid onto the rubber composition in a manner such that the weave of the cloth is on the bias, as illustrated, so as not to prevent transverse bending of the ultimately formed composite strip and serves to provide longitudinal stability which prevents undue stretching of the strip during application. In some instances, as where the ultimately formed strips are used for advertising novelties, the reinforcing cloths 11 and 12 are relatively unimportant and may be omitted, or one or the other may be omitted, as desired.

On the outer surfaces of the reinforcing cloth layers 11 and 12, where used, or directly upon the upper and lower faces of layer 10 there is applied a tacky adhesive coating 14 and 15 which may likewise be of rubber composition or other pressure sensitive adhesive which retains its adhesive quality over long periods when adequately protected. During the course of manufacture of the composite shown in Figure 1 the layer 10 is first extruded and it then is passed between suitable forming devices which apply the reinforcing cloth layers 11 and 12, where these are used. The composite sheet is then passed directly to machines which apply uniform layers of adhesive 14 and 15 to the cloth layers, where used, or to the layer 10 where the reinforcing cloth layers 11 and 12 are not used. The composite which then has a tacky adhesive layer 14 and 15 on opposite surfaces thereof is immediately covered by means of protective sheets 16 and 17. In accordance with the present invention at least one of these sheets is composed of a heat workable plastic sheet. Formerly it was customary to provide a cloth layer of Holland cloth or similar protective material. In accordance with this invention I prefer to use plastic sheet on both surfaces at 16 and 17 although one of these may be replaced by cloth of the Holland type, if desired.

For the plastic sheet 16 or 17 or both I prefer to use sheet made of polyethylene or other similar heat workable plastic. The plastic materials suitable for this invention should be capable of softening under temperatures ranging from 130° to 250° F. so that when softened they may be ironed down flat against the adhesive so as to remove any wrinkles formed therein during use of the strip.

Figures 2, 3:
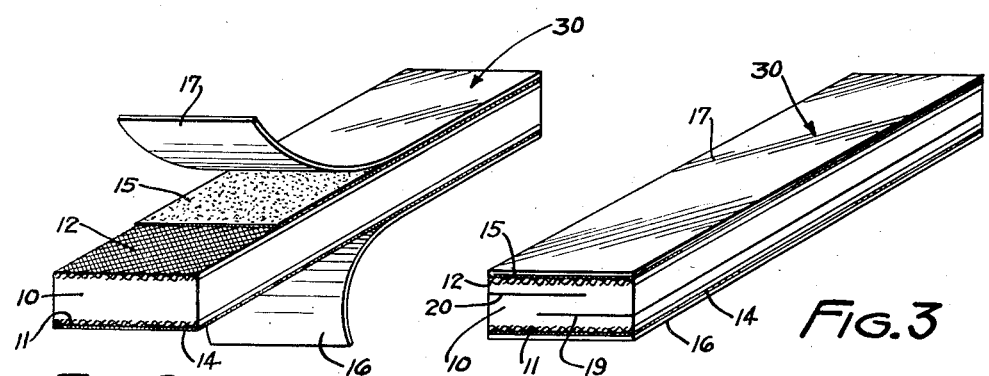
Figure 2 is an isometric view of a strip of material of the present invention adhesively coated on opposite faces and reinforced and covered with removable material over the adhesive surfaces shown during a further step in the process of manufacture.
Figure 3 is an isometric view corresponding to Figure 2 of a strip of material such as that shown in Figure 2, further processed for specific use with reference to frost shield manufacture.

After formation of the composite sheet, as shown in Figure 1, it is sent through a slitting machine of any suitable design whereby the sheet is cut longitudinally along the dotted line 18 and strips, as shown in Figure 2, are thereby formed. When the composite strips are utilized for the manufacture of frost shields they are then preferably sent through slitting machines which slit the central rubber compound portion 10 along the edges as shown by the slitting lines 19 and 20 of Figure 3, which is in accordance with Patent No. 2,111,343. When the composite strips are not used for frost shields the slits 19 and 20 may be omitted.

In Figure 2 the strip cut from the composite sheet is shown broken away and is shown with the protective sheets 16 and 17 peeled back from the adhesive layers 14 and 15. The adhesive layer 15 is also shown removed at the upper surface so as to expose the underlying reinforcing strip 12, the bottom reinforcing cloth layer 11 being likewise illustrated in end view.

Figures 4, 5:
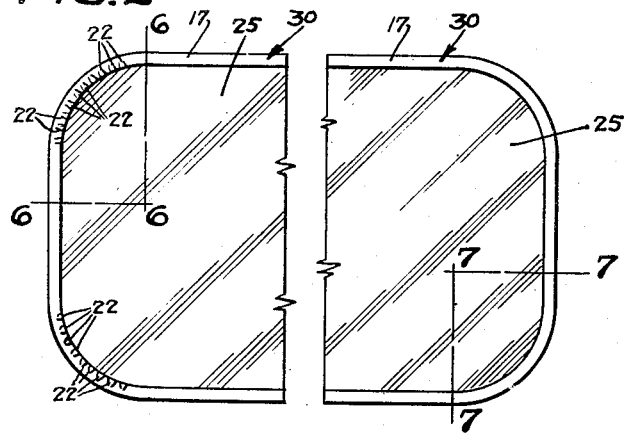
Figure 4 is a plan view which illustrates a frost shield advertising novelty or the like planar article, showing the strip of material applied and illustrating the wrinkling or buckling occurring at the rounded portions of the periphery of the article and which, according to prior practice, had to be removed and replaced by especially die-cut curved segments.
Figure 5 is a plan view which shows the device of Figure 4 further processed in accordance with the instant invention.

When applying the strip 30 to an article of manufacture such as a planar object which may be a frost shield or advertising novelty, the composite strip, as shown in Figure 2 or Figure 3, is first taken by the operator and one of the facings 16 and 17 is removed. Where the composite strip of Figures 1–3 has only one plastic protective sheet 16 or 17, this plastic protective layer is permitted to remain in place and the other protective sheet is removed. I prefer, however, to use plastic protective sheeting at 16 and 17 since this provides a smoother and more vapor tight surface on the adhesive layers than was possible with protective sheets of the starched cambric types which in spite of the starched coating still have a slight surface irregularity produced by the weave of the cambric. When the one protective layer 16 or 17 is removed, leaving in place the opposite plastic protective layer, the composite strip 30 is supplied to the article of manufacture which is illustrated in Figure 4 as a frost shield of glass or other transparent material 25. It is to be understood, however, that the invention is not limited to the manufacture of frost shields and that the article 25 may be a metal, plastic or glass advertising novelty or metal or plastic planar object, along the edge or a portion of the edge of which it is desired to place the composite strip for basing or attaching purposes.

In accordance with this invention the composite strip designated 30 in Figures 2, 3 and 4, 5 is laid onto the article of manufacture 25 by the operator with the just exposed adhesive surface toward the member 25 and along the edge thereof. When the composite strip 30 is applied to straight portions of the edge this can be done without causing any wrinkling of the upper protective layer 17 but at the curved portion of the member 25 the transverse bending of the composite strip 30 to accommodate it to the curvature of the member 25 causes the formation of buckling or wrinkles 22 which results from the relative inflexibility of the protective layer 17 which refuses to bend edgewise. Formerly, when the protective layer 17 of cloth or plastic buckled at this step in the process, the entire protective layer would be peeled off and replaced by especially cut straight and curved segments. Eight such segments (four straight and four curved) were required for the ordinary frost shield. This is obviated by the present invention. When the composite strip 30 is curved around the article of manufacture 25, the undulations, wrinkles or buckling, however designated, form at 22 mostly on the inside of the curve although some stretching and lifting may also occur at the outside edge of the curve. I have discovered that if the bucklings 22 or lifting of the plastic layer 17 is permitted to remain, the underlying adhesive 15 which is exposed under the buckled or wrinkled or lifted portions of the plastic layer 17 at the curve, will dry out, become uneven and will render the article of manufacture unsuitable for its intended purpose. This is particularly true in frost shield manufacture where it is essential that the adhesive layer 15 be in perfect condition when the layer 17 of protective material is finally removed just prior to the application of the frost shield to the glass of an automotive or aircraft vehicle, or the like.

Figures 6, 7:
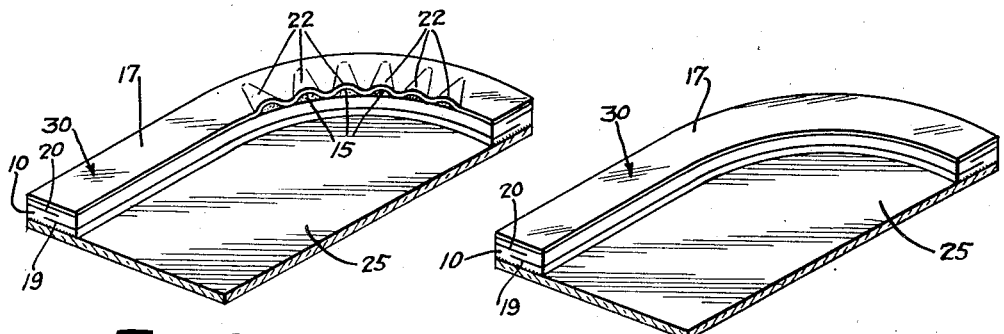
Figure 6 is a fragmentary isometric view showing an enlargement of the portion 6—6—6 of the device shown in Figure 4.
Figure 7 is a fragmentary isometric view showing an enlargement of the portion 7—7—7 of Figure 5.
Figure 8:
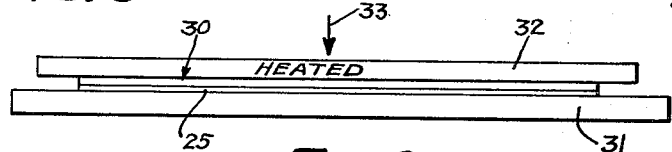
Figure 8 is a side elevational view of an apparatus of the present invention for accomplishing the ironing step thereof.

In accordance with the present invention the next step of the process involves ironing down the wrinkled or buckled plastic protective layer 17. This may be accomplished by placing the assembly of Figures 4 and 6 between a flat supporting surface 31 and a superimposed heated plate 32, as shown in Figure 8. The plate 32 is heated just sufficiently to warm the plastic layer 17 and render it workable under heat so that when gentle pressure is applied to the plate 32, as indicated by the arrow 33, the wrinkles and bucklings 22, however designated, and any lifted portion of the protective plastic layer 17 on the outside of the curve will be gently forced down again into perfect smooth contact with the underlying adhesive layer 15 and the plastic once again forced down then cools and retains the curved configuration without strain or further tendency to buckle or lift. The finished article is illustrated in Figure 5 and in enlarged view in Figure 7 where it will be noted that the wrinkles and buckling 22, which appear in Figures 4 and 6, have entirely disappeared at the curved corner of the article of manufacture and the layer 17 is in smooth and uniform contact with the underlying adhesive at all portions of the periphery of the article 25. Furthermore, there is no tendency for the plastic layer thereafter to buckle or wrinkle or lift as the ironing with heat relieved all strains. Consequently, the underlying adhesive is fully protected until the device is ready to be installed in final location.

Figure 9:
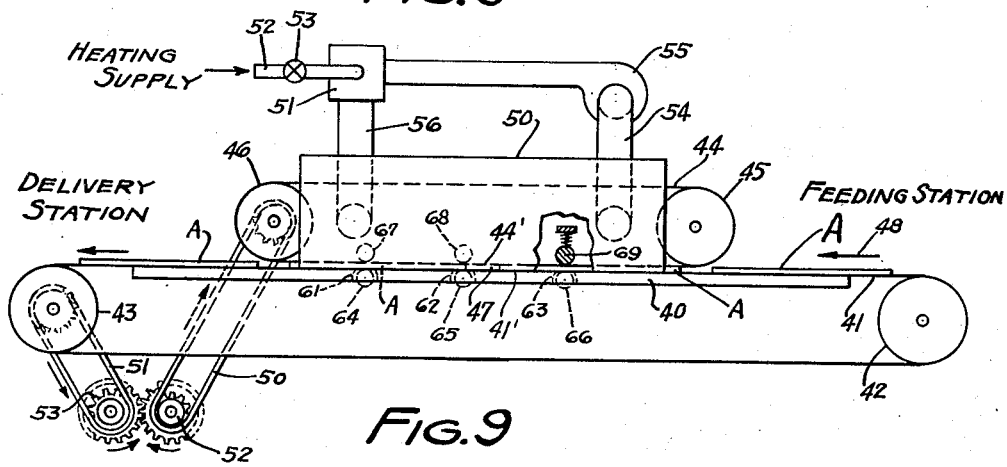
Figure 9 is a side elevational view of another form of apparatus of the invention for performing the ironing step on a continuous basis.

Referring to Figure 9 there is illustrated a machine for carrying out continuously the ironing process. In the machine shown in Figure 9 there is provided a table 40 over which an endless conveyor 41 travels, the conveyor 41 being supported and driven by rolls 42 and 43 from a suitable power source. Over the conveyor 41 there is provided a superimposed belt 44 which is preferably an endless belt of metal supported and driven on and by rolls 45 and 46. The belt 44 should be of approximately the same width as the conveyor 41 and should be sufficiently wide to receive the articles of manufacture being made completely between the edges of the conveyor. The bottom course of travel of the belt 44 illustrated at 44' is spaced slightly from the top course of travel of conveyor 41 illustrated at 41' so as to provide a space 47 into which the frost shields or other articles being manufactured can be carried during the ironing operation. The conveyor 41 is tensioned sufficiently and supported by table 40 so that when the frost shields or other articles of manufacture A of Figure 9 are carried flat and level by the conveyor 41 in the direction of arrow 48 into said space 47 and the belt 44 exerts gentle pressure thereon. As an added measure of pressure control the table is cut away at 61, 62 and 63 and there are set in a plurality of rollers 64, 65 and 66 mounted so that the upper part of the rollers are just slightly above the upper surface of table 40. Then above these rollers are spaced parallel rollers 67, 68 and 69 mounted on springs, so that they press down on the upper (or back side) of the bottom course 44' of belt 44, thus assisting in holding it level and also assisting in applying the gentle pressure necessary for the plastic flattening operation, the conveyor 41 meanwhile being supported by the rollers 64, 65 and 66.

The frost shields or other articles of manufacture A are placed on the conveyor 41 at the feeding station with the strip 30 upward so as to expose the wrinkled or buckled portion 22 to the heat and gentle pressure of metal belt 44. Belt 44 and conveyor 41 are driven simultaneously by means of the chains 50 and 51 from the sprockets 52 and 53 which are suitably geared together so as to drive the belts 41 and 44 at the same speed where they are contiguous. The belt 44 and conveyor 41 have the same lineal speed and hence exert gentle pressure upon the frost shields without producing any rubbing action. The belt 44 and conveyor 41 are driven from a variable speed power source, not shown, so as to provide adjustment of ironing time to accommodate various articles and plastics. A portion of the belt 44 between the supporting and driving rolls 45 and 46 is enclosed in a housing 50 which is provided with a heating device herein illustrated as the heat exchanger 51 which is provided with a heating fluid such as steam or hot water by means of a supply pipe 52 through a control valve 53. A duct at 54 draws air from the housing 50 and circulates the air by means of the continuously operating blower 55 through the heat exchanger 51 and then returns the heated air duct 56 to the housing 50 where the heated air serves to heat the belt 44 and thus through it serves to provide the heat necessary for softening the plastic layer 17 of the frost shields or other articles of manufacture sufficiently to make the plastic workable and to iron it down flat. Preferably the control valve 53 is provided with automatic controls operated by a bulb in housing 50 so as to maintain the temperature within the housing 50 constant within a relatively few degrees and also provide for temperature adjustment by the operator. The temperature which is maintained within the housing 50 depends upon the thickness and softening point of the particular plastic used. When the plastic layer 17 is of polyethylene plastic the air within housing 50 is maintained at approximately 235° F. Care should be taken not to overheat the plastic so as to cause it to melt or flow or to infuse into the underlying adhesive layer 15 or stick to the metal belt. The exact temperature can be determined easily by trial of a few articles of manufacture through the device, and it is raised or lowered until the proper ironing temperature for the particular plastic in use has been determined. A relatively short course of travel is all that is needed for most work since the plastic protective layer 17 is thin and heats rapidly and when heated can easily be pressed by gentle pressure into contact with the underlying layer.

Figures 10, 11:
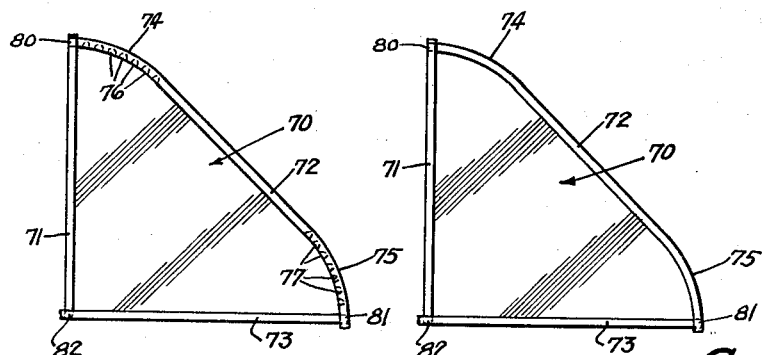
Figures 10 and 11 are related plan views showing another very common form of frost shield shape which is used for the ventilating windows of automobiles wherein the invention is used with significant advantage, Figure 10 illustrating the wrinkle formation at curved surfaces, and Figure 11, the finished product, free from wrinkles, of the invention.

In Figures 10 and 11 there is illustrated another common frost shield shape wherein the present invention may be used with significant advantages. In the frost shield 70 of these figures, the corners are rectangular or nearly so, and the marginal attaching and spacing strip 71—72—73 is accordingly most conveniently applied as three separate strips for the three sides of the (generally) triangular shape. However, alongside 72 there are curves at 74 and 75 whereat wrinkles 76 and 77 are developed in the overlying plastic protective layer covering the underlying adhesively faced rubber compound spacing strip. These wrinkles are removed by ironing the plastic flat after the strips are applied, this being accomplished by the apparatus of Figure 8 or 9 and with the methods hereinbefore described. It may be noted that the plastic protective strip of the pieces 71 and 72, 72 and 73, 73 and 71 overlap at the corners 80, 81 and 82, respectively, that at 80 being shown lifted slightly. These extending ends on the plastics go beyond the rubber of the strip that they protect and hence are free and easily lifted to facilitate tripping the plastic for removal.

As many apparently widely different embodiments of this invention may be made without departing from the spirit and scope thereof, it is to be understood that I do not limit myself to the specific embodiments herein.

What I claim is:

1. As an article of manufacture having a member of substantially planar configuration and a periphery which is curved at least at certain portions thereof, said member having a strip of material adhesively bonded thereto around at least some portions of curved segments of said periphery, said strip having an adhesive facing for attaching the strip and hence the member to another surface, said adhesive facing having a smoothly ironed, strain-free, removable plastic facing thereon for protecting the adhesive until used, said facing being continuous at least throughout said curved portions and an adjacent straight portion.

2. The article of manufacture of claim 1 further characterized in that the facing extends continuously throughout those portions of the periphery of the member, where the underlying strip is also continuous.

3. A frost shield including a transparent member having a substantially planar configuration and a marginal edge which is curved at least along certain portions thereof, a spacing and fastening strip extending completely around said periphery, said strip having one face bonded to the shield and having an opposite adhesive face for attaching the strip and hence the shield in spaced relation to another surface, said opposite adhesive face of the strip being covered by a removable strip of strain-free plastic sheet smoothly ironed flat thereon and free from surface buckling at said curved portions of the strip.

4. The method which comprises applying an adhesive coating on opposite faces of a flexible base strip, covering said adhesive coatings with removable protective strips at least one of which is a heat workable strip of plastic sheeting, removing one of said protective strips so as to expose the adhesive coating underneath but leaving the other adhesive coating covered by said plastic strip, applying said flexible strip with the exposed adhesive coating in bonding relation to a curved edge of a generally planar device to which the strip is desired to be attached, said strip being transversely bent edgewise along said curve and then smoothing the consequently buckled edgewise bent protective strip by ironing it at an elevated temperature until the protective strip is flattened into engagement with the adhesive surface which it covers.

5. The method of claim 4 further characterized in that the device to which the adhesively coated strip is attached is generally planar and has a marginal edge that is curved throughout a portion thereof, said adhesively coated strip being applied entirely around said marginal edge.

6. The method of claim 5 further characterized in that the generally planar device to which the adhesively coated strip is attached is transparent.

7. The method of making frost shields and similar planar objects having a curved edge having a transversely flexible strip adhesively attached to a curved marginal edge thereof which strip has an opposite adhesive surface covered by a removable heat workable plastic protective sheet covering which protects the adhesive until used, comprising applying said strip to the margin of the planar object while the heat workable plastic protective sheet covering is in place thereon, said strip with the plastic protective covering in place thereon being bent transversely around said curved edge, and then ironing the plastic protective covering with gentle pressure and at an elevated temperature until the incidentally buckled edgewise bent protective strip is flattened into engagement with the adhesive surface which it covers.

8. The process of claim 7 further characterized in that the plastic sheet is ironed by applying opposed gentle pressure throughout planar surfaces that are maintained against the assembly being treated.

9. The process of claim 7 further characterized in that the ironing is accomplished by passing the planar assembly between parallel heated planar surfaces to apply gentle pressure on the buckled plastic sheet, at least one said planar surface in contact with said buckled plastic strip being heated sufficiently to cause the buckled plastic to become heat workable.

CARL F. WALZ.

REFERENCES CITED

The following references are of record in the file of this patent:

UNITED STATES PATENTS

| Number | Name | Date |
|---|---|---|
| 1,361,970 | Dickey | Dec. 14, 1920 |
| 1,777,435 | Hogelund | Oct. 7, 1930 |
| 1,915,098 | Kile | June 20, 1933 |
| 2,080,006 | Jackson | May 11, 1937 |
| 2,096,750 | Lawrence | Oct. 26, 1937 |
| 2,098,127 | Auger | Nov. 2, 1937 |
| 2,111,343 | Walz | Mar. 15, 1938 |
| 2,292,024 | Dreher | Aug. 4, 1942 |
| 2,294,347 | Bauer et al. | Aug. 25, 1942 |
| 2,307,406 | Howard | Jan. 5, 1943 |
| 2,402,548 | Guyer | June 25, 1946 |
| 2,407,867 | Buchanan | Sept. 17, 1946 |
| 2,459,295 | Skoog | Jan. 18, 1949 |